No. 884,570. PATENTED APR. 14, 1908.
A. P. CLARIDGE.
ENAMEL SIGN.
APPLICATION FILED NOV. 25, 1907.

Witnesses.
S. Ralph Warnken
Ida A. Dasch

Inventor.
Arthur P Claridge
by
Steuart & Steuart
Attorneys

UNITED STATES PATENT OFFICE.

ARTHUR P. CLARIDGE, OF BALTIMORE, MARYLAND.

ENAMEL SIGN.

No. 884,570.   Specification of Letters Patent.   Patented April 14, 1908.

Application filed November 25, 1907. Serial No. 403,729.

*To all whom it may concern:*

Be it known that I, ARTHUR P. CLARIDGE, a citizen of the United States of America, residing at the city of Baltimore, State of Maryland, have invented certain new and useful Improvements in Enamel Signs, of which the following is a specification.

The invention to be hereinafter described and claimed, provides means whereby enameled plates used as signs, labels, &c. may be secured to a support and the enamel protected from stress due to fastening.

The nature of my device is such that the enamel is not only protected from stress transmitted by the fastening means, but that discoloration of the enamel by contact with the fasteners is prevented.

The invention also operates to prevent discoloration by making it feasible to cover the entire surface of the metal plate with enamel and by protecting the latter from injury.

Various devices having this end in view are in use. In one of these the metal plate is provided with bosses extending through the enamel, and apertured to receive fastening screws. In order to prevent fracture of the enamel by the pressure of the screws, the ends of the bosses are left bare. As the plate is generally of iron, or some easily corroded metal, the enamel surrounding the boss becomes discolored. Further, the body of the screws comes into intimate contact with the enamel, and if made of corrosive material furnishes another source of discoloration.

Figure 1:
Figure 2:
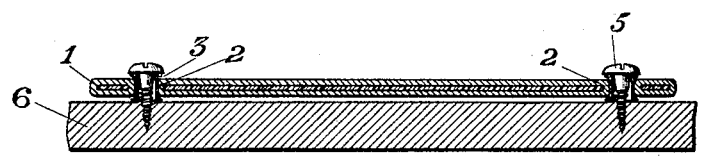
Figure 3:
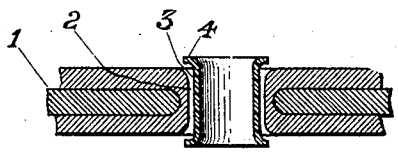

Referring to the accompanying drawings, Figure 1 is a perspective view of the enameled sign, supplied with the protecting means which constitutes the subject matter of my invention. Fig. 2 is a cross section taken through the fastening means. Fig. 3 is an enlarged axial cross section of one of the protecting sleeves.

A plate (1) of iron or other suitable material perforated at convenient points, indicated by reference characters 2 is completely coated with enamel, the inner surface of the apertures, as well as the rest of the plate being completely covered. Cylindrical sleeves (3) of external diameter less than the internal diameter of the openings in the enameled plate and composed of non-corrosive material, are inserted in the openings. The ends of these sleeves are turned over substantially at right angles to the cylindrical body and parallel to the surface of the plate forming flanges (4) separated by a space greater than the entire thickness of the plate, including the metallic portion and both coatings of enamel. The sleeve is so constructed as to offer sufficient resistance to the insertion of a screw or nail to space the head of such fastening means a distance from the support greater than the entire thickness of the sign and the flanges.

When it is desired to fasten the sign to a support, screws (5) of a suitable size are inserted in the sleeves and turned till their heads engage the flanges, and attach the sleeves rigidly to the support (6). By this means the sign is held in position as securely as may be desired, and the enameled surfaces are protected from the stress exerted by the screw by the resistance which the sleeves interpose between the screw head and the support. The sleeves also furnish a non-corrosive covering for the screw, so that any products which may result from its decomposition do not come in contact with the enameled surface to discolor it. By using this type of protector sleeve it is made feasible to cover the entire surface of the metal plate with the enamel and leave no exposed surface to corrode and discolor the sign, at the same time no danger of injuring the enamel is incurred.

Having thus described my invention, what I claim and desire to secure by Letters Patent is:

1. The combination of a support, a metal plate coated with enamel and having a suitable opening, a sleeve of length greater than the combined thickness of the plate and enamel, in the opening and fastening means extending through the sleeve and engaging the support.

2. The combination of a support, a metal plate coated with enamel, and having suitable openings, a sleeve of length greater than the combined thickness of the plate and enamel, in each opening and fastening means extending through the sleeve and engaging the support, a head on the fastening means engaging one end of the sleeve and pressing the other end of the sleeve against the support.

3. The combination of a support, a plate coated with enamel and having suitable openings, a flanged sleeve of length greater than the combined thickness of the plate and enamel, in each opening and fastening means extending through the sleeve and engaging the support.

4. The combination of a support, a plate having suitable openings and coated with enamel, a flanged sleeve of length greater than the combined thickness of the plate and enamel extending through each opening, and fastening means in the sleeve engaging one flange and pressing the other flange against the support.

5. The combination of a support, a metal plate having suitable openings and coated with enamel, in each opening a sleeve having at each end a flange, the two flanges being spaced by a distance greater than the combined thickness of the plate and enamel, and fastening means extending through the sleeves and engaging the support.

6. The combination of a support, a metal plate having suitable openings and coated with enamel, in each opening a sleeve having a flange at each end, the two flanges being spaced by a distance greater than the combined thickness of the plate and enamel, and inclosing the enameled plate between them, and fastening means engaging the one flange extending through the sleeve and pressing the other flange against the support.

7. The combination of a support, a metal plate coated with enamel and having suitable openings the lateral surfaces of which are enameled, a flanged sleeve of length greater than the combined thickness of the plate and enamel in the opening, the flanges engaging the enameled surfaces, and fastening means extending through the sleeve and engaging the support.

Signed by me at Baltimore, Maryland this 20th day of November, 1907.

ARTHUR P. CLARIDGE.

Witnesses:
EDWARD L. BASH,
B. SCHROETER.